Oct. 24, 1933.   F. O. ALBERTSON   1,931,483
DOUBLE POLE HANDLE SWITCH
Filed Feb. 27, 1933
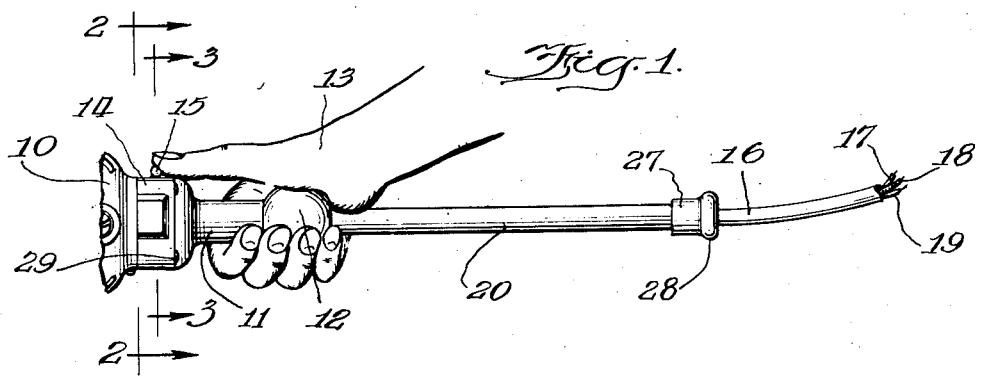
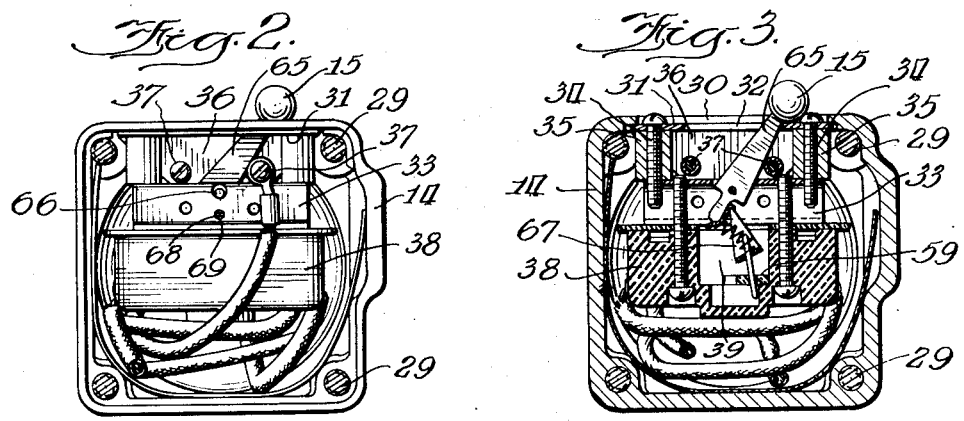
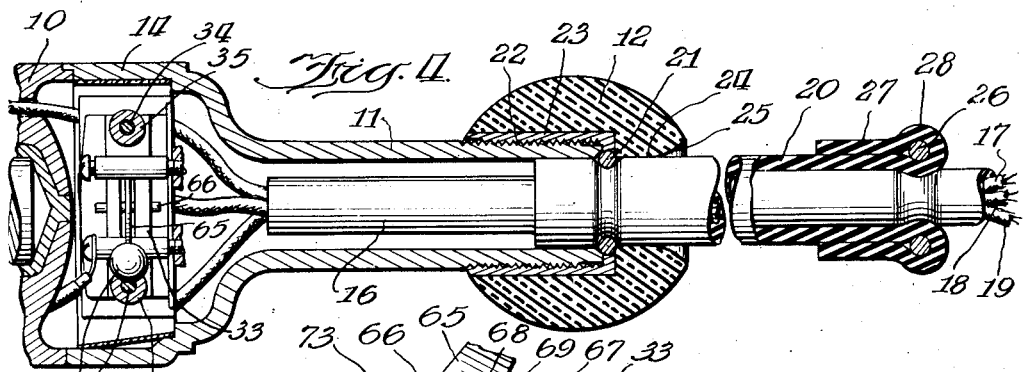
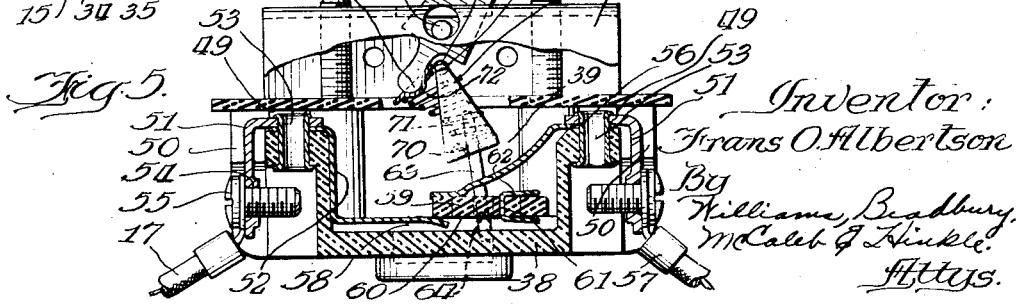
Inventor:
Frans O. Albertson
By Williams, Bradbury,
McCaleb & Hinkle.
Attys.

Patented Oct. 24, 1933

1,931,483

UNITED STATES PATENT OFFICE 1,931,483

DOUBLE POLE HANDLE SWITCH

Frans O. Albertson, Sioux City, Iowa, assignor to Albertson & Company, Inc., Sioux City, Iowa, a corporation of Iowa Application February 27, 1933. Serial No. 658,820

6 Claims. (Cl. 200—157)

The present invention relates to a double pole handle switch, and is particularly concerned with a handle switch of the type adapted to be used for controlling the supply of electric current to electric tools, such as electric polishers for polishing the bodies of automotive vehicles and the like.

One of the objects of the invention is the provision of an improved handle switch peculiarly adapted to be used for electric polishers by means of which the polisher is adapted to be operated and controlled more conveniently without tiring the operator, and by means of which the polisher is always capable of instant control.

Another object of the invention is the provision of an improved handle and switch arrangement having a ball shaped member adapted to be located within the palm of the hand of the user so that the polisher may be moved pivotally with respect to the hand without tiring the wrist of the operator, and having an electric switch actuating member so disposed with respect to said ball shaped member that it is in the position to be actuated by the thumb of the operator while still grasping the ball.

Another object of the invention is the provision of an improved handle and switch structure particularly adapted for use with electric polishers and provided with means for anchoring the supply cable in the handle and for grounding the casing of the electric polisher.

Other objects and advantages of the invention will be apparent from the accompanying drawing and the following description, in which similar characters of reference indicate similar parts throughout the several views.

Referring to the drawing,

Fig. 1 is a side elevational view of the improved handle switch, showing the position of the hand of the operator;

Fig. 2 is a transverse sectional view, taken through the casing of the handle switch, with the switch unit in elevation, and taken on the plane of the line 2—2 of Fig. 1;

Fig. 3 is another sectional view, taken on the plane of the line 3—3 of Fig. 1, looking in the direction of the arrows, showing the details of mechanism of the switch;

Fig. 4 is a sectional view of the switch mechanism, with the cover plate removed, the section being taken on a plane passing through the axis of the handle; and Fig. 5 is an enlarged sectional view of the switch mechanism.

Referring to the drawing, 10 indicates the casing of the electric polisher, which is usually an electric motor provided with a rotating pad support and a flexible pad, which may be covered with a hood of native lambs' wool or the like.

The polisher is usually provided with a handle projecting from one side, adapted to be grasped in either the right or the left hand, and with an axially extending handle 11, which is grasped by the right hand in Fig. 1.

The handle 11 is provided with an enlarged spherical formation 12, adapted to substantially fit in the palm of the hand 13 of the operator. The handle 11 is connected to the casing 10 by a switch housing 14, from which projects the switch operating member 15. The current is supplied to the motor through the conductor cable 16, which is preferably provided with a plurality of insulated wires 17, 18 and 19, one of these wires being utilized for grounding the casing of the motor, and the other two for current supply.

The cable 16 is preferably covered with a flexible rubber hose 20 which extends into the tubular handle 11 and is secured to the cable by a clamping metal ring 21. The end of the handle 11 may be threaded at 22 and the ball 12 may be constructed of insulating material, such as "bakelite", and the ball may be secured to the handle by having embedded in it a threaded tubular member 23.

The ball 12 is provided with a bore 24 large enough to pass the rubber hose 20, and the bore 24 flares outward at 25 in order to prevent a sharp bend in the hose and cable at that point.

The metal clamping ring or wire 21 and the cable are secured to the handle 11 by being clamped against the end of the handle by the ball 12. The opposite end of the hose 20 may also be anchored to the cable by means of the metallic clamping wire 26, forming a ring, and the hose may be turned back upon itself at 27, presenting a substantially circular formation 28, which covers the ring 26 and protects the end of the hose from injury.

The cable 16 is thus permanently anchored to the handle so that the conductors cannot be torn loose from the switch and the strain is relieved from the cable 16 at the point of its ingress into the handle, the strain being transferred to the hose 20 by means of the clamping ring 26.

The switch housing 14 preferably comprises a substantially box-like enlargement forming an integral part of the handle and joined thereto, and adapted to be secured to the motor 10 by a plurality of screw bolts 29. Switch housing 14 is provided with an opening 30 at its upper edge for passing the switch actuating member 15, which is preferably provided with a ball shaped formation for engaging the thumb.

The aperture 30 is closed by a cover plate 31, which bears the indicia "On" and "Off" at the opposite ends of a slot 32. The cover plate 31 is secured to a channelled member 33 by a pair of screw bolts 34 and spacing members 35. Cover plate 31 is also provided with a depending flange 36 having apertures for receiving screw bolts 37 which secure the switch unit in the switch housing 14.

The switch unit preferably comprises a molded insulating body 38, preferably constructed of material such as "bakelite", the body 38 forming a chamber 39 for receiving the mechanism. In the case of a double pull switch, the body 38 is formed with a pair of grooves 49 in its upper surface, establishing communication between the outside of the body 38 and the chamber 39. Two grooves 50 may extend from the grooves 49 down each end of the body 38.

Each of the grooves 49 supports a connector body 51 and a switch contact 52, these members being secured together and to the body 38 by a tubular rivet 53.

The connector body 51 comprises an angular sheet metal member, which extends downward in the groove 50 and is formed with a threaded aperture 54 for receiving the screw bolt 55, by means of which one of the conductors 17 is connected to the switch.

The two in-going conductors 17 and 18 may thus be connected to a pair of contacts 52, which are adapted to be brought into electric connection with a similar pair of contacts 56 extending from the opposite side of the body 38 and located above the contacts 52.

Contacts 56 are likewise secured to the body 38 by tubular rivets 53 and are secured to connector bodies 51, which are utilized for connecting the conductors 57 which lead directly to the motor.

The lower contacts 52 are preferably disposed in transversely extending grooves 58 in the body 38, permitting them a range of movement with respect to the body, and a substantially rectangular insulating member 59 is slidably mounted on the bottom 60 of the chamber 39.

The insulating member 59 comprises a plate of fiber having a transverse aperture 61, within which a bridging contact stirrup 62 is mounted, the ends of the stirrup being bent over so as to engage the contacts 52 and 56. Two stirrups 62 are provided, one at each side of the insulating fiber 59, so as to connect each contact 52 to the corresponding contact 56.

The switch is open when the switch is in the position shown in Fig. 5, but when the stirrup 62 passes to the right and is located between the contacts 52, 56, the switch is closed.

The sliding switch member 59 is actuated by a downwardly extending bar 63, which projects through a slot 64 in the fiber plate 59. The channelled member 33 has the switch lever 65 pivotally mounted in it by a pin 66.

A substantially U shaped snap member 67 has outwardly turned ends 68 which are also pivotally mounted in apertures 69 in channelled member 33. The bar 63 extends through an aperture 70 in a snap member 67 and is provided with a head 71 for securing it in place. A helical spring 72 engages about the head 71 and has its upper end engaging the ball shaped extension 73 of the switch lever 65.

When the switch lever 65 is moved to the left, in the position of Fig. 5, the upper end of the spring is moved over past the line of pivots 66, 68, and thereupon the lower end of the snap member 67 and the bar 63 snap toward the left, actuating the fiber plate 59 and closing the switch.

A similar action takes place on moving the switch to the opposite side. The switch lever 65 is always held at one end or the other of its slot 32 by the spring 72. The ball shaped member 15 conceals the indicia "On" or "Off" adjacent which it may be located, and thus the location of the ball shaped member exposes one or the other indicia. The switch is off when the ball is at the side of the slot opposite from the word "Off" and the word "Off" is exposed.

The operator is thus enabled to see at all times from the switch whether it is on or off, and by means of the location and size of the housing 14 and the handle switch arrangement with the ball 12, the polisher may be held by means of the handle 11 and the switch actuated by the same hand during the polishing operation.

It will thus be observed that I have invented an improved handle switch arrangement, by means of which the operator is enabled to manipulate the electric polisher with less fatigue and to turn the polisher on or off with the thumb of the hand which is supporting the polisher handle. The operator may get ready for the polishing operation and grasp the polisher properly with his hands before turning the polisher on and he may readily turn it off without changing his hands from the position in which he places them for the polishing operation.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a handle switch, the combination of a handle member of substantially cylindrical shape provided with an enlarged spherical member adapted to be held in the palm of the hand, a switch having an actuating member for controlling the motor driven implement held by said handle, said actuating member being disposed at a point spaced from said spherical member longitudinally of said handle member in position to be engaged by the thumb of the hand when said spherical member is in the palm of the hand.

2. In a handle switch, the combination of a handle member of substantially cylindrical shape provided with an enlarged spherical member adapted to be held in the palm of the hand, a switch having an actuating member for controlling the motor driven implement held by said handle, said actuating member being disposed at a point spaced from said spherical member longitudinally of said handle member in position to be engaged by the thumb of the hand when said spherical member is in the palm of the hand, said switch actuating member comprising a ball shaped member carried by a lever disposed in a slot, and indicia carried by a switch housing below said ball shaped member to be exposed or covered by said ball shaped member to indicate the position of the switch.

3. In a handle switch, the combination of a tubular housing provided with a box-like enlargement, a snap switch unit located in said enlargement and having a switch actuating member projecting from a slot in said enlargement, conductors leading to said switch unit through said housing, and a ball shaped member carried by said housing and located in spaced relation to said switch actuating member, whereby the ball shaped member may be held in the palm of the hand while the switch actuating member is actuated by the thumb of the hand.

4. In a handle switch, the combination of a tubular housing provided with a box-like enlargement, a snap switch unit located in said enlargement and having a switch actuating member projecting from a slot in said enlargement, conductors leading to said switch unit through said housing, and a ball shaped member carried by said housing and located in spaced relation to said switch actuating member, whereby the ball shaped member may be held in the palm of the hand while the switch actuating member is actuated by the thumb of the hand, said ball shaped member engaging a metal anchoring ring carried by the conductors for anchoring said conductors in said housing.

5. In a handle switch, the combination of a handle having a ball shaped formation with a switch unit carried by said handle, said switch unit comprising two pairs of contacts, a sliding insulating member mounted between said contacts and having a pair of bridging contacts, an actuating bar extending through an aperture in said sliding member, a pivotally mounted lever for supporting said actuating bar, a second pivotally mounted lever located in a range of movement of the thumb when the hand engages said spherical member, and resilient means between said two pivotally mounted members whereby the sliding member is snapped into or out of closed contact position when the actuating member is moved by the thumb of the hand.

6. In a handle switch, the combination of a handle having a ball shaped formation with a switch unit carried by said handle, said switch unit comprising two pairs of contacts, a sliding insulating member mounted between said contacts and having a pair of bridging contacts, an actuating bar extending through an aperture in said sliding member, a pivotally mounted lever for supporting said actuating bar, a second pivotally mounted lever located in a range of movement of the thumb when the hand engages said spherical member, and resilient means between said two pivotally mounted members whereby the sliding member is snapped into or out of closed contact position when the actuating member is moved by the thumb of the hand, said spherical member being formed with an annular shoulder and provided with a threaded sleeve for engaging said handle, and a metallic clamping member carried by conductors leading to said switch unit, said metallic clamping member being secured to said handle by said spherical member.

FRANS O. ALBERTSON.